Oct. 28, 1941.   E. E. WOLLER   2,260,418
ANTIFRICTION PIVOT BEARING
Filed Dec. 23, 1940
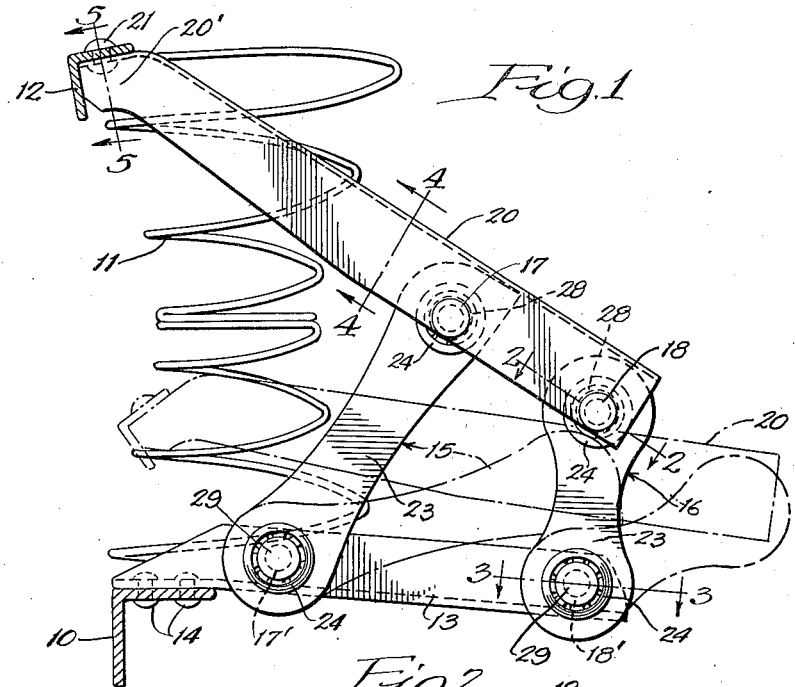
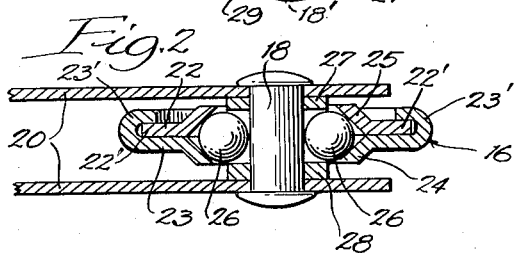
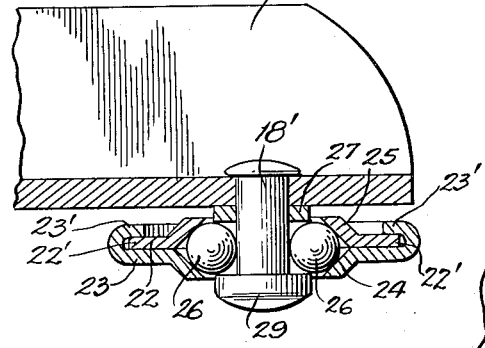
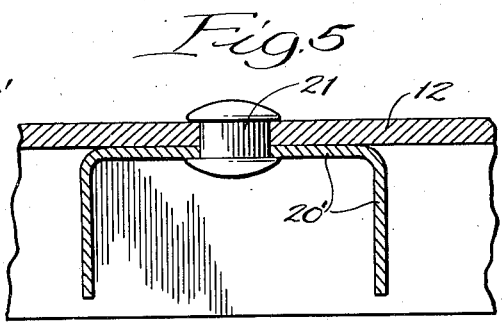
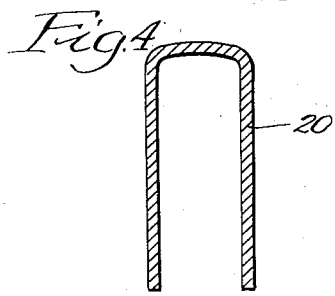
Inventor:
Edward E. Woller,
By Soans, Pond & Anderson,
Attorneys.

Patented Oct. 28, 1941

2,260,418

UNITED STATES PATENT OFFICE 2,260,418

ANTIFRICTION PIVOT BEARING

Edward E. Woller, Kenosha, Wis., assignor to Simmons Company, New York, N. Y., a corporation of Delaware Application December 23, 1940, Serial No. 371,250

3 Claims. (Cl. 308—189)

This invention relates to improvements in pivot bearings, and more particularly to bearings that form pivot joints between members that have overlapped flat surfaces. Where such members are connected solely by a plain pivot stud, changes in the relative angular positions of such members when under load often involves more or less side thrust of the overlapping surfaces on each other, giving rise to chafing, wear and noise, and the creation of an objectionably loose joint. An object of this invention is to provide an improved pivot joint for parts having overlapped substantially flat surfaces that will be free from the above noted faults, will better resist relative side thrust of the pivoted parts, and will be noiseless in operation,—this latter being particularly advantageous in situations where noise is highly objectionable.

In the accompanying drawing I have shown the invention applied to an anti-sway device for bed-springs such as forms the subject matter of Letters Patent to Don Carlos Travis, No. 1,545,713, dated July 14, 1925, and contemplate that such will be its principal field of service; but the principle of the invention is capable of application to other devices of more or less similar nature where it is desirable to reduce friction, wear, looseness and noise between pivoted members having substantially flat overlapping surfaces, and create greater lateral stability.

A practical embodiment of this invention, as embodied in an anti-sway device for bed-springs of the character shown in the aforesaid Travis Patent No. 1,545,713 is illustrated in the accompanying drawing, in which—

Fig. 1 is a side elevation.

Fig. 2 is a section taken on the line 2—2 of Fig. 1.

Fig. 3 is a section taken on the line 3—3 of Fig. 1; and

Figs. 4 and 5 are sections taken on the lines 4—4 and 5—5, respectively, of Fig. 1.

Referring to the drawing, the spring supporting frame of the bed-spring includes a surrounding frame of angle iron, one of the side members of which is shown in cross section at 10; and stepped on the angle iron 10 is an outer row of springs 11; the inner rows of springs and their supports not being illustrated herein, since they have no relation to the present invention.

In a spring of this general type it is customary to equip the outer edge of the top of the spring with a surrounding and usually continuous border frame, herein shown as consisting of angle bars 12, to which the upper ends of the outer coils 11 are secured.

The anti-sway device for preventing an inward pull of the upper ends of the springs 11 when a load is imposed on the bed-spring comprises a downwardly and inwardly extending arm 13, herein shown as a section of angle iron, that is strongly secured at its upper outer end to the horizontal limb of the frame member 10 by a pair of rivets 14, a pair of links designated as entireties by 15 and 16 at their lower ends pivoted on studs 17' and 18' mounted in a vertical limb of the angle bar 13, and an upper distance bar 20 of inverted-U cross section, as shown in Fig. 4, the sides of which straddle the upper ends of the links 15 and 16 and are connected to the latter by pivot studs 17 and 18. The upper and outer end portion of the distance bar 20 is reduced in height and widened, as shown at 20' (Figs. 1 and 5), and the horizontal limb of the widened portion is secured to the underside of the horizontal limb of the angle bar bounding frame 12 by a rivet 21.

Describing now those structural features of the pivotal connections of the upper ends of the links 15 and 16 to the distance bar 20 (which are identical), and the pivotal connections of the lower ends of the links 15 and 16 to the rigid angle bar 13 (which are also identical), and referring mainly to Figs. 2 and 3, each of the links 15 and 16 preferably is composed of a pair of flat contiguous sections 22 and 23 that are interlocked at their outer edges as by crimping the outer edge 23' of the section 23 over and around the outer edge 22' of the section 22. The sections 23 and 22 of the links 15 and 16 are formed in their upper portions with a ball race consisting of opposed outwardly extending inclined sides 24 and 25 that encircle the pivot studs 17 and 18, and seat a circular row of steel balls 26 that also encircles and bears on the pivot studs 17 and 18. To confine the balls 26 against possible escape from the ball race 24, 25, a pair of flat washers 27 and 28 are interposed between the ring of balls 26 and the adjacent parallel walls of the distance bar 20.

The same ball race 24, 25 is employed on the lower ends of the links 15 and 16 in connection with the identical pivot studs 17' and 18'. As shown in Fig. 3, the studs 17' and 18' are rigidly mounted in the vertical limb of the angle bar 13, and the lower ends of the links 15 and 16 overlap the outer side of the vertical limb of the angle bar 13. A washer 27 is inserted between the ring of balls 26 and the opposed side of the angle bar 13 to confine the balls 26 against escape; but the outer washer, such as 28 (Fig. 2) may be dispensed with by making the head 29 of the studs 17' and 18' of sufficient diameter to fulfill the function of the outer washer 28.

When the anti-sway device is functioning under a load on the bed-spring, the distance bar 20 and the links 15 and 16 shift between the full and dotted line positions shown in Fig. 1. From the foregoing description it will be apparent that the described anti-friction bearings not only reduce wear on the pivot studs, but they also prevent side wear, chafing, and looseness of fit and noise between the overlapping members 15 and 16 and the bars 13 and 20, producing a noiseless anti-sway device which, for obvious reasons, is particularly useful in a bed structure, wherein the elimination of noise is highly desirable.

I claim:

1. In an anti-friction pivot bearing of the class described, the combination with two flat members having overlapping portions, and a stud extending through and pivotally connecting said overlapping portions, of a ball race formed in one of the members encircling said stud, said ball race having opposed outwardly extending sides, a ring of balls in said ball race in rolling contact with said stud, and a washer encircling said stud between said ring of balls and the adjacent side of the other of said members.

2. In an anti-friction bearing of the class described, the combination of a member having parallel laterally spaced flat walls, a second member having a portion thereof disposed between the spaced walls of said first named member, a stud extending through and pivotally connecting the overlapping portions of said members, a ball race formed in said second member encircling said stud, said ball race having opposed outwardly extending sides, a ring of balls in said ball race in rolling contact with said stud, and a pair of washers respectively encircling said stud between said ring of balls and the adjacent parallel walls of said first named member.

3. In an anti-friction bearing of the class described, the combination of a member having parallel laterally spaced flat walls, a second member composed of flat contiguous sections interlocked at their edges and having a portion thereof disposed between the spaced walls of said first named member, a stud extending through and pivotally connecting the overlapping portions of said members, a ball race in said second member encircling said stud, said ball race having opposed outwardly extending sides respectively integral with the sections of said second member, a ring of balls in said ball race in rolling contact with said stud, and a pair of flat washers respectively encircling said stud between said ring of balls and the adjacent parallel walls of said first named member.

EDWARD E. WOLLER.